US007349382B2

(12) United States Patent
Marimuthu et al.

(10) Patent No.: US 7,349,382 B2
(45) Date of Patent: Mar. 25, 2008

(54) REVERSE PATH FORWARDING PROTECTION OF PACKETS USING AUTOMATED POPULATION OF ACCESS CONTROL LISTS BASED ON A FORWARDING INFORMATION BASE

(75) Inventors: Peram Marimuthu, Sunnyvale, CA (US); Priyank Ramesh Warkhede, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 10/651,179

(22) Filed: Aug. 28, 2003

(65) Prior Publication Data

US 2005/0021752 A1 Jan. 27, 2005

Related U.S. Application Data

(63) Continuation-in-part of application No. 10/215,719, filed on Aug. 10, 2002, now Pat. No. 7,103,708.

(51) Int. Cl.
*H04L 12/56* (2006.01)
*G06F 12/14* (2006.01)

(52) U.S. Cl. .................. 370/351; 370/392; 709/242; 711/163; 726/27

(58) Field of Classification Search ............... None
See application file for complete search history.

(56) References Cited

U.S. PATENT DOCUMENTS

| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,088,032 A | 2/1992 | Bosack |
| 5,319,763 A | 6/1994 | Ho et al. |
| 5,339,076 A | 8/1994 | Jiang |
| 5,383,146 A | 1/1995 | Threewitt |

(Continued)

OTHER PUBLICATIONS

Tong-Bi Pei and Charles Zukowski, "VLSI Implementation of Routing Tables: Tries and CAMS," Networking in the Nineties, Proceedings of the Annual Joint Conference of the Computer and Communications Societies, New York, Apr. 7, 1991, pp. 515-524, vol. 2, Conf. 10.

(Continued)

*Primary Examiner*—Gary Portka
(74) *Attorney, Agent, or Firm*—The Law Office of Kirk D. Williams

(57) ABSTRACT

Reverse path forwarding protection of packets is provided using automated population of access control lists based on a forwarding information base. One implementation identifies a lookup value by extracting one or more values including a source address from a packet. An access control list lookup operation is performed on an access control list based on the lookup value to identify a permit or a deny condition, the access control list including multiple access control list entries. The packet is processed based on the permit or the deny condition identified in by the access control list lookup operation, this processing the packet based on the permit condition includes performing a forwarding lookup operation on a representation of a forwarding information base to identify a location and forwarding the packet to the location. The access control list entries are automatically generated based on a forwarding information base.

24 Claims, 14 Drawing Sheets

U.S. PATENT DOCUMENTS

| | | | |
|---|---|---|---|
| 5,404,482 | A | 4/1995 | Stamm et al. |
| 5,428,565 | A | 6/1995 | Shaw |
| 5,440,715 | A | 8/1995 | Wyland |
| 5,450,351 | A | 9/1995 | Heddes |
| 5,481,540 | A | 1/1996 | Huang |
| 5,515,370 | A | 5/1996 | Rau |
| 5,684,954 | A | 11/1997 | Kaiserswerth et al. |
| 5,740,171 | A | 4/1998 | Mazzola et al. |
| 5,748,905 | A | 5/1998 | Hauser et al. |
| 5,802,567 | A | 9/1998 | Liu et al. |
| 5,841,874 | A | 11/1998 | Kempke et al. |
| 5,842,040 | A | 11/1998 | Hughes et al. |
| 5,852,569 | A | 12/1998 | Srinivasan et al. |
| 5,898,689 | A | 4/1999 | Kumar et al. |
| 5,920,886 | A | 7/1999 | Feldmeier |
| 5,930,359 | A | 7/1999 | Kempke et al. |
| 5,956,336 | A | 9/1999 | Loschke et al. |
| 5,978,885 | A | 11/1999 | Clark, II |
| 6,000,008 | A | 12/1999 | Simcoe |
| 6,041,389 | A | 3/2000 | Rao |
| 6,047,369 | A | 4/2000 | Colwell et al. |
| 6,061,368 | A | 5/2000 | Hitzelberger |
| 6,069,573 | A | 5/2000 | Clark, II et al. |
| 6,081,440 | A | 6/2000 | Washburn et al. |
| 6,091,725 | A | 7/2000 | Cheriton et al. |
| 6,097,724 | A | 8/2000 | Kartalopoulos |
| 6,134,135 | A | 10/2000 | Andersson |
| 6,137,707 | A | 10/2000 | Srinivasan et al. |
| 6,141,738 | A | 10/2000 | Munter et al. |
| 6,148,364 | A | 11/2000 | Srinivasan et al. |
| 6,154,384 | A | 11/2000 | Nataraj et al. |
| 6,175,513 | B1 | 1/2001 | Khanna |
| 6,181,698 | B1 | 1/2001 | Hariguchi |
| 6,199,140 | B1 | 3/2001 | Srinivasan et al. |
| 6,219,748 | B1 | 4/2001 | Srinivasan et al. |
| 6,236,658 | B1 | 5/2001 | Essbaum et al. |
| 6,237,061 | B1 | 5/2001 | Srinivasan et al. |
| 6,240,003 | B1 | 5/2001 | McElroy |
| 6,240,485 | B1 | 5/2001 | Srinivasan et al. |
| 6,243,667 | B1 | 6/2001 | Kerr et al. |
| 6,246,601 | B1 | 6/2001 | Pereira |
| 6,285,378 | B1 | 9/2001 | Duluk, Jr. |
| 6,289,414 | B1 | 9/2001 | Feldmeier et al. |
| 6,295,576 | B1 | 9/2001 | Ogura et al. |
| 6,307,855 | B1 | 10/2001 | Hariguchi |
| 6,308,219 | B1 | 10/2001 | Hughes |
| 6,317,350 | B1 | 11/2001 | Pereira et al. |
| 6,374,326 | B1 | 4/2002 | Kansal et al. |
| 6,377,577 | B1 | 4/2002 | Bechtolsheim et al. |
| 6,389,506 | B1 | 5/2002 | Ross et al. |
| 6,430,190 | B1 | 8/2002 | Essbaum et al. |
| 6,434,662 | B1 | 8/2002 | Greene et al. |
| 6,467,019 | B1 | 10/2002 | Washburn |
| 6,526,474 | B1 | 2/2003 | Ross |
| 6,535,951 | B1 | 3/2003 | Ross |
| 6,546,391 | B1 | 4/2003 | Tsuruoka |
| 6,597,595 | B1 | 7/2003 | Ichiriu et al. |
| 6,606,681 | B1 | 8/2003 | Uzun |
| 6,651,096 | B1 | 11/2003 | Gai et al. |
| 6,658,002 | B1 * | 12/2003 | Ross et al. .................. 370/392 |
| 6,707,692 | B2 | 3/2004 | Hata |
| 6,715,029 | B1 | 3/2004 | Trainin et al. |
| 6,717,946 | B1 | 4/2004 | Hariguchi et al. |
| 6,738,862 | B1 | 5/2004 | Ross et al. |
| 6,775,737 | B1 | 8/2004 | Warkede et al. |
| 2001/0038554 | A1 | 11/2001 | Takata et al. |
| 2003/0005146 | A1 | 1/2003 | Miller et al. |
| 2003/0223259 | A1 | 12/2003 | Roth |
| 2003/0231631 | A1 | 12/2003 | Pullela |
| 2004/0030802 | A1 | 2/2004 | Eatherton et al. |
| 2004/0030803 | A1 | 2/2004 | Eatherton et al. |
| 2004/0078485 | A1 * | 4/2004 | Narayanan .................. 709/242 |

OTHER PUBLICATIONS

Anthony Mcauley and Paul Francis, "Fast Routing Table Lookup Using CAMs," Networking: Foundation for the Future, Proceedings of the Annual Joint Conference of the Computer and Communications Societies, Los Alamitos, Mar. 28, 1993, pp. 1382-1391, vol. 2, Conf 12.

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast 1Pv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

P. Ferguson, "Network Ingress Filtering: Defeating Denial of Service Attacks which employ IP Source Address Spoofing," RFC 2827, May 2000, 10 pages, Internet Engineering Task Force, www.ietf.org.

Yogen K. Dalal and Robert M. Metcalf, "Reverse Forwarding of Broadcast Packets," pp. 1040-1048, Dec. 1978, Xerox Corporation and Stanford University.

"Unicast Reverse Path Forwarding," Cisco IOS Release 11.1(17)CC, pp. 1-22, Cisco Systems, Inc., Oct. 1, 2002.

"Unicast Reverse Path Forwarding Enhancements," Cisco IOS Release 12.1(2)T, pp. 1-14, Cisco Systems, Inc., Sep. 8, 2002.

"Configuring Unicast Reverse Path Forwarding," Cisco IOS Security Configuration Guide, pp. SC-455-SC-470, Sep. 15, 2002.

* cited by examiner

GENERATING DENY
NODES BASED ON
FORWARDING
INFORMATION BASE
750

```
GENERATE_DENY(NODE){
IF NODE IS A LEAF AND NOT A PERMIT NODE
    THEN GENERATE DENY ENTRY FOR PREFIX/ADDRESS OF LEAF
ELSE IF (NODE->LEFT & NODE-> RIGHT ARE NOT PERMIT CONDITIONS)
    THEN IF NODE HAS ONE CHILD
        THEN GENERATE DENY ENTRY CORRESPONDING TO THE
            NON-EXISTENT CHILD NODE
    ELSE {IF (NODE->LEFT EXISTS AND IS NOT PERMIT CONDITION)
            THEN GENERATE_DENY(NODE->LEFT)
         IF (NODE->RIGHT EXISTS AND IS NOT PERMIT CONDITION)
            THEN GENERATE_DENY(NODE->RIGHT)
         }
RETURN
}
```

REVERSE PATH FORWARDING PROTECTION OF PACKETS USING AUTOMATED POPULATION OF ACCESS CONTROL LISTS BASED ON A FORWARDING INFORMATION BASE

CROSS-REFERENCE TO RELATED APPLICATIONS

This is a continuation-in-part of application Ser. No. 10/215,719, filed Aug. 10, 2002, now U.S. Pat. No. 7,103,708 and is hereby incorporated by reference.

TECHNICAL FIELD

One embodiment of the invention relates to communications and computer systems, especially routers, packet switching systems, and other devices; and more particularly, one embodiment relates to reverse path forwarding protection using automated population of access control lists based on a forwarding information base.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

RFC 2827 describes the need to implement unicast reverse path forwarding to prevent source address forging. There are two known ways for performing this operation. First, static access control lists (ACLs) can be manually created by an operator to specify the source addresses allowed on a particular interface. Major disadvantages of this approach include that different ACLs need to be manually defined for each interface, and these ACLs need to be manually updated to accommodate changes in the network topology to provide proper protection.

A second known approach is to perform two lookup operations on the forwarding information base: one based on the destination to identify a location which to forward the packet and a second lookup operation based on the source address of the packet to identify whether the packet was received on an allowed interface. This approach requires a second lookup operation on the FIB, which either decreases the rate at which packets can be forwarded (as it requires two lookups instead of just one) or it requires additional or duplicated components to perform these two lookup operations in parallel. Moreover, a third lookup operation is typically also performed, this one on a set of predefined ACLs to further identify how to process the packet. Performing all these lookup operations affects the rate at which packets can be processed and/or the amount of hardware and software required to perform such operations.

In one known approach, when unicast reverse path forwarding is enabled on an interface, the router examines all packets received on that interface. The router checks to make sure that the source address appears in the routing table and matches the interface on which the packet was received. This feature checks to see if any packet received at a router interface arrives on one of the best return paths to the source of the packet. The feature does this by doing a reverse lookup in the routing information base based on the source address of the packet. If a corresponding reverse path for the packet is not located, this feature can drop or forward the packet, depending on whether an ACL is specified in a configuration command. If an ACL is specified in the command, then when (and only when) a packet fails the unicast reverse path forwarding check, the ACL is checked to see if the packet should be dropped (using a deny statement in the ACL) or forwarded (using a permit statement in the ACL). If no ACL is specified in the configuration command, the router drops the forged or malformed packet immediately.

SUMMARY

Disclosed are, inter alia, methods, apparatus, data structures, computer-readable medium, mechanisms, and means for reverse path forwarding protection of packets using automated population of access control lists based on a forwarding information base. One embodiment identifies a lookup value by extracting one or more values including a source address from a packet. An access control list lookup operation is performed on an access control list based on the lookup value to identify a permit or a deny condition, with the access control list including multiple access control list entries. The packet is processed based on the permit or the deny condition identified in by the access control list lookup operation. This processing of the packet based on the permit condition typically includes performing a forwarding lookup operation on a representation of a forwarding information base to identify a location and forwarding the packet to the location. The access control list entries are automatically generated based on the forwarding information base.

In one embodiment, the access control list entries are automatically generated based on the forwarding information base and a predefined access control list. In one embodiment, the access control list entries are automatically updated in response to a change to the forwarding information base or to the predefined access control list.

In one embodiment, automatically generating the access control list entries includes identifying, for an entry associated with a permit condition of the predefined access control list, an intersection of the source address of the entry and addresses (e.g., fully-specified addresses, prefixes) in the forwarding information base, and generating one or more of the access control list entries based on the intersection.

In one embodiment, automatically generating the access control list entries includes identifying multiple deny operation entries based on the forwarding information base, these deny operations corresponding to a complement of addresses in the forwarding information base, and placing these deny operation entries before, in a search order, multiple predefined access control list entries corresponding to the predefined access control list; and wherein the deny condition is generated if one of the deny operation entries is matched during the access control list lookup operation. In one embodiment, identifying multiple deny operation entries based on the forwarding information base includes constructing a binary trie based on the forwarding information base, and traversing the binary trie to identify the deny operation entries.

In one embodiment, performing the access control list lookup operation includes performing an associative memory lookup operation on an associative memory, wherein the access control list is programmed into the associative memory; and wherein the entries automatically generated based on the forwarding information base are configured to generate a force no-hit result if matched during the associative memory lookup operation to result so that the permit or deny condition is identified based on associative memory entries corresponding to the predefined access control list, and the associative memory includes one or more deny entries to generate the deny condition if none of the entries automatically generated based on the forwarding information base are matched.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 7D illustrates a process used in one embodiment for automatically generating access control list deny entry based on a forwarding information base;

DETAILED DESCRIPTION

Figure 1:
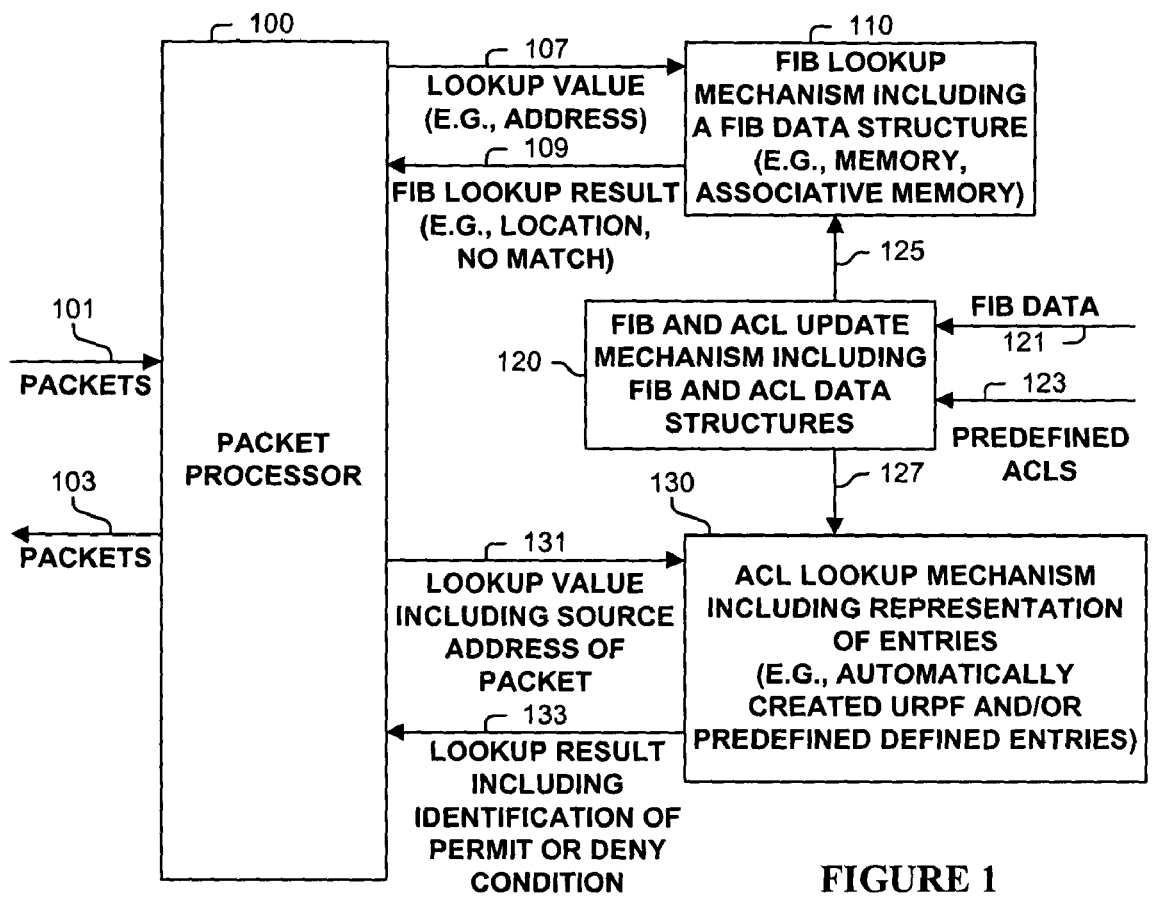
FIG. 1 is a block diagram illustrating a system used in one embodiment for processing packets using reverse path forwarding protection of packets using automated population of access control lists based on a forwarding information base.

Disclosed are, inter alia, methods, apparatus, data structures, computer-readable medium, mechanisms, and means for reverse path forwarding protection of packets using automated population of access control lists based on a forwarding information base, which may be of particular use in routers, packet switching systems, and other devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for reverse path forwarding protection of packets using automated population of access control lists based on a forwarding information base. One embodiment identifies a lookup value by extracting one or more values including a source address from a packet. An access control list lookup operation is performed on an access control list based on the lookup value to identify a permit or a deny condition, the access control list including multiple access control list entries. The packet is processed based on the permit or the deny condition identified in by the access control list lookup operation, this processing the packet based on the permit condition includes performing a forwarding lookup operation on a representation of a forwarding information base to identify a location and forwarding the packet to the location. The access control list entries are automatically generated based on the forwarding information base.

In one embodiment, the access control list entries are automatically generated based on the forwarding information base and a predefined access control list. In one embodiment, the access control list entries are automatically updated in response to a change to the forwarding information base or to the predefined access control list.

In one embodiment, automatically generating the access control list entries includes identifying, for an entry associated with a permit condition of the predefined access control list, an intersection of the source address of the entry and addresses (e.g., fully-specified addresses, prefixes) in the forwarding information base, and generating one or more of the access control list entries based on the intersection.

In one embodiment, automatically generating the access control list entries includes identifying multiple deny operation entries based on the forwarding information base, these deny operations corresponding to a complement of addresses in the forwarding information base, and placing these deny operation entries before, in a search order, multiple predefined access control list entries corresponding to the predefined access control list; and wherein the deny condition is generated if one of the deny operation entries is matched during the access control list lookup operation. In one embodiment, identifying multiple deny operation entries based on the forwarding information base includes constructing a binary trie based on the forwarding information base, and traversing the binary trie to identify the deny operation entries.

In one embodiment, performing the access control list lookup operation includes performing an associative memory lookup operation on an associative memory, wherein the access control list is programmed into the associative memory; and wherein the entries automatically generated based on the forwarding information base are configured to generate a force no-hit result if matched during the associative memory lookup operation to result so that the permit or deny condition is identified based on associative memory entries corresponding to the predefined access control list, and the associative memory includes one or more deny entries to generate the deny condition if none of the entries automatically generated based on the forwarding information base are matched.

FIG. 1 is a block diagram illustrating a system used in one embodiment for processing packets using reverse path forwarding protection of packets using automated population of access control lists based on a forwarding information base. Forwarding information base (FIB) data 121 and predefined (e.g., customer or automatically defined from another mechanism) access control lists (ACLs) 123 are received by FIB and ACL update mechanism 120, which typically includes data structures for storing FIB and ACL data. FIB and ACL update mechanism 120 automatically determines, initially and in response to changes to an ACL or FIB that requires an update, access control entries including those automatically determined based on a forwarding information base. These ACL entries are sent (as indicated by arrow 127) to ACL lookup mechanism 130. Similarly, FIB lookup mechanism, which includes copy of the FIB data typically stored in a data structure conducive to performing a fast lookup, such as in memory or in an associative memory, receives FIB updates (as indicated by arrow 125).

Packets 101 are received by packet processor 100. A lookup value 131 is generated by extracting one or more values including the source address from the packet. ACL lookup mechanism 130 performs a lookup operation based on its one or more access control lists, and provides to packet processor 100 lookup result 133, which typically includes an indication of a permit or deny and optionally other indications. Packet processor 100 then appropriately processes the corresponding packet. If the packet 101 is associated with a permit condition, the destination address of the packet is provided as a lookup value 107 to FIB lookup mechanism 110, which performs a lookup operation and returns lookup result 109, which typically includes a location to which to forward the packet (which is then done by packet processor 100 as indicated by packets 103) or a no-match indication. In one embodiment, the lookup operations in lookup mechanisms 110 and 130 are performed in parallel. In one embodiment, the lookup operations in lookup mechanisms 110 and 130 are performed sequentially. Of course, described are aspects of some of an unlimited number of embodiments for processing packets using reverse path forwarding protection of packets using automated population of access control lists based on a forwarding information base.

Figure 2A:
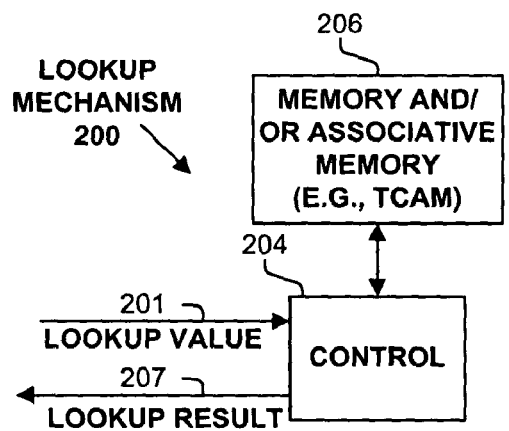
FIGS. 2A-C illustrate a few of an unlimited number configurations of a lookup mechanism for used by one embodiment.
Figure 2B:
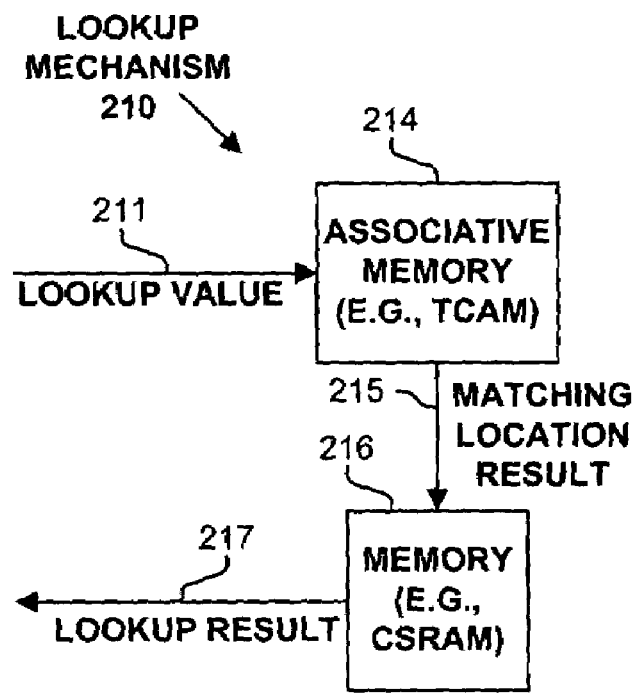
Figure 2C:
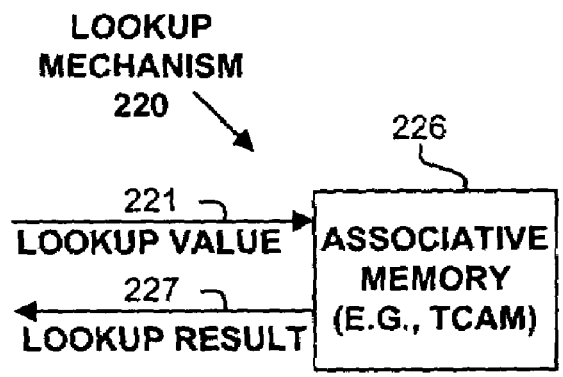

FIGS. 2A-C illustrate a few of an unlimited number configurations of a lookup mechanism for used by one embodiment. FIG. 2A illustrates a lookup mechanism 200 used in one embodiment. Control 204 performs or causes to be performed a lookup operation based on lookup value 201 in memory or associative memory 206 in order to produce lookup result 207, which typically includes an indication of a permit or deny condition. There are an unlimited number of techniques for performing lookup operations which can be used by one embodiment.

FIG. 2B illustrates a lookup mechanism 210 used in one embodiment. Associative memory 214 performs a lookup operation based on lookup value 211, and generates matching location result 215. A lookup operation is performed in adjunct memory 216 to produce lookup result 217, which typically includes an indication of a permit or deny condition.

FIG. 2C illustrates a lookup mechanism 220 used in one embodiment. Associative memory 226 performs a lookup operation based on lookup value 221, and generates lookup result 227 (e.g., a matching location or no-hit indication, or other indication).

Figure 3:
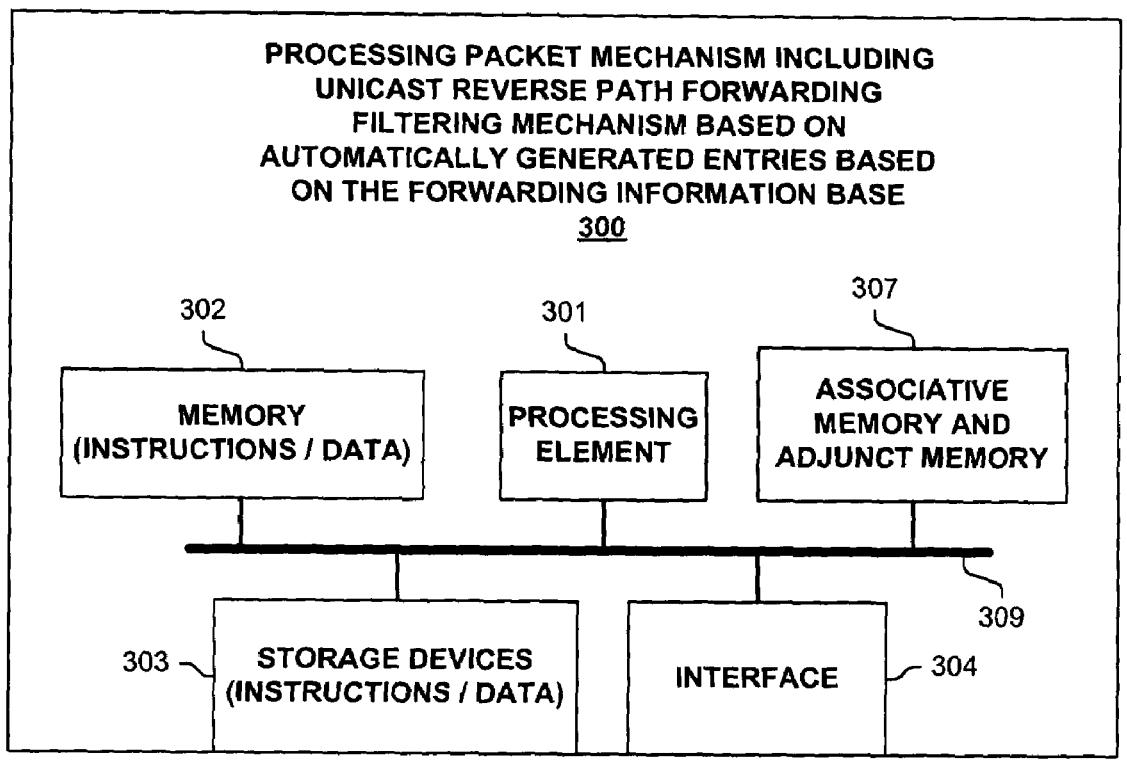
FIG. 3 is a block diagram illustrating a system used in one embodiment for processing packets using reverse path forwarding protection of packets using automated population of access control lists based on the forwarding information base.

FIG. 3 is a block diagram illustrating a system 300 used in one embodiment for processing packets using reverse path forwarding protection of packets using automated population of access control lists based on the forwarding information base. For example, one embodiment includes a process corresponding to one of the block or flow diagrams illustrated herein, or corresponding to any other means or mechanism implementing all or part of a claim with other internal or external components or devices possibly implementing other elements/limitations of a claim. Additionally, a single or multiple systems, devices, components, etc. may comprise an embodiment.

In one embodiment, system 300 includes a processing element 301, memory 302, storage devices 303, an interface 304 for receiving and transmitting packets or other items, and an associative memory and adjunct memory 307, which are coupled via one or more communications mechanisms 309 (shown as a bus for illustrative purposes).

Various embodiments of system 300 may include more or less elements. The operation of system 300 is typically controlled by processing element 301 using memory 302 and storage devices 303 to perform one or more tasks or processes, such as, but not limited to processing packets using reverse path forwarding protection of packets using automated population of access control lists based on the forwarding information base. One embodiment uses another lookup mechanism rather than associative memory and adjunct memory 307 to perform the lookup operation in the access control lists automatically populated based on the forwarding information base.

Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with one embodiment of the invention. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with one embodiment of the invention.

Figure 4:
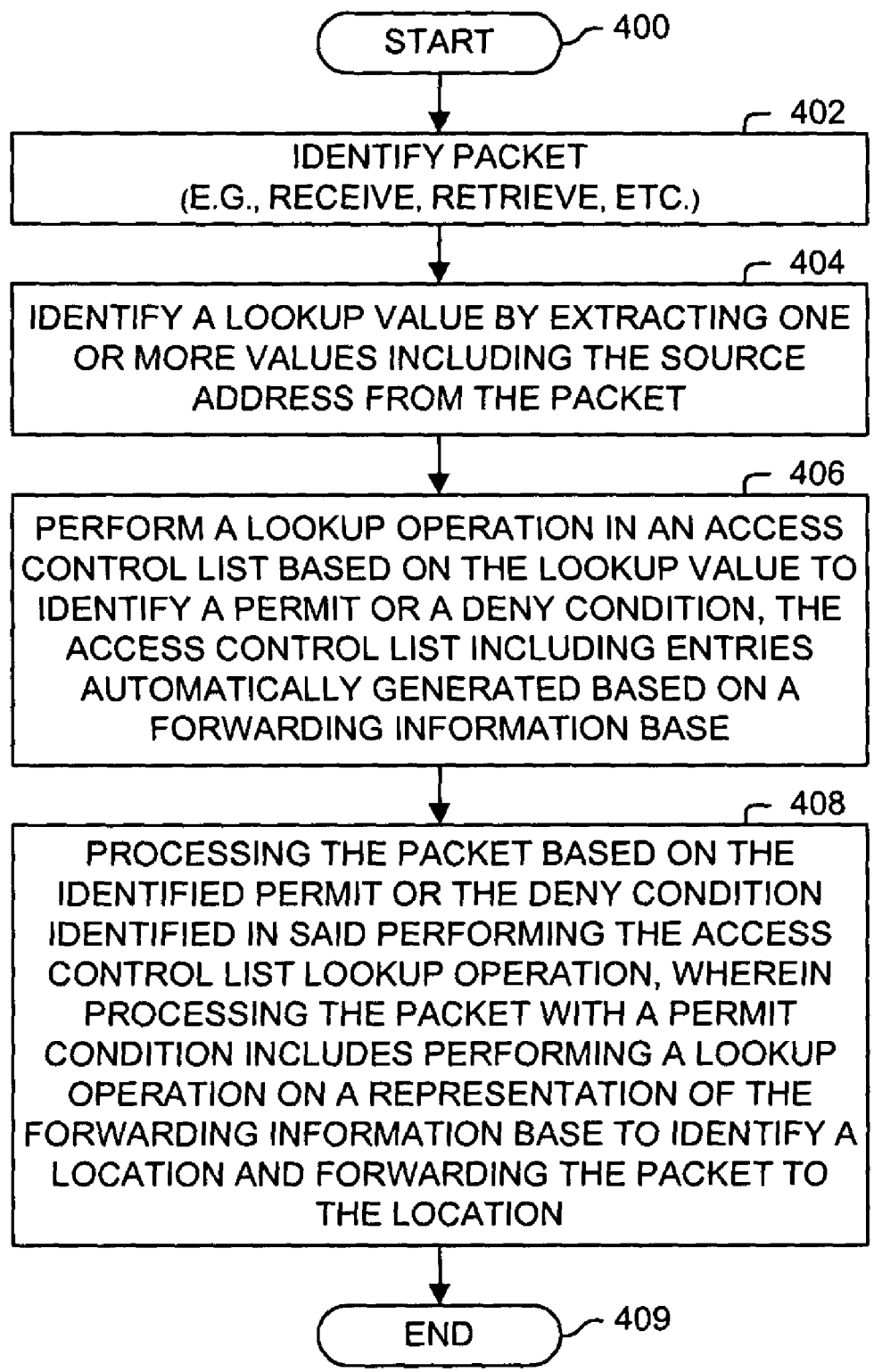
FIG. 4 is a flow diagram illustrating a process used in one embodiment for processing packets using reverse path forwarding protection of packets using automated population of access control lists based on the forwarding information base.

FIG. 4 is a flow diagram illustrating a process used in one embodiment for processing packets using reverse path forwarding protection of packets using automated population of access control lists based on the forwarding information base. Processing begins with process block 400, and proceeds to process block 402, wherein a packet is identified (e.g., received, removed from a queue, etc.). In process block 404, a lookup value is identified, typically by extracting one or more fields including the source address from the packet. In process block 406, a lookup operation to identify a permit or deny condition and possibly other indications is performed based on the lookup value in an access control list, which includes entries automatically generated based on a forwarding information base and possibly from other sources (e.g., predefined ACLs, etc.). In process block 408, the packet is processed based on the identified permit or the deny condition. Also, if it is a permit operation, the destination address is used to lookup in the forwarding information base a destination location for the packet, to which it is forwarded. In one embodiment, this lookup operation is performed in parallel with other processing steps. Processing is complete as indicated by process block 409.

Figure 5A:
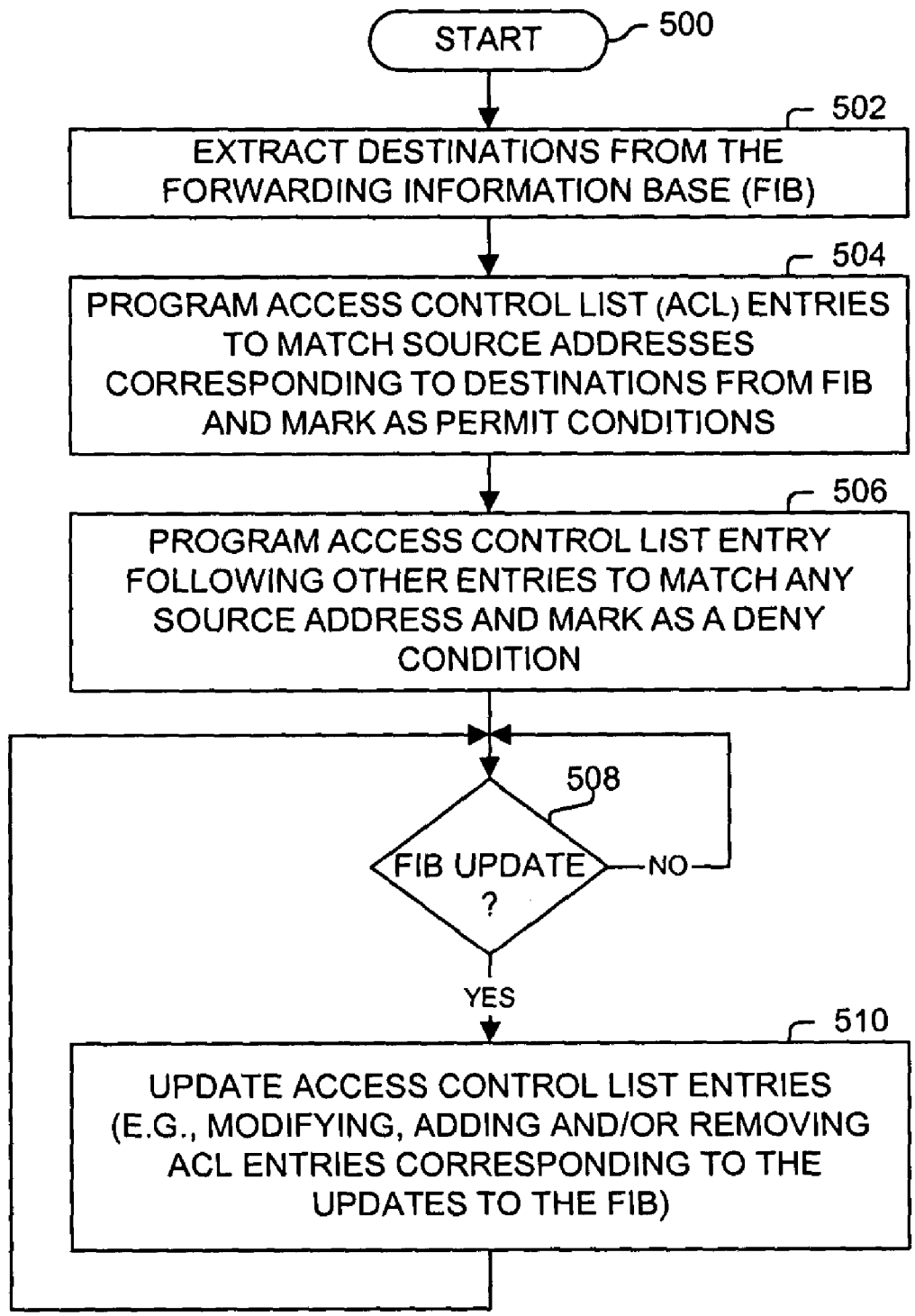
FIG. 5A illustrates a process used in one embodiment for automatically populating one or more access control lists based on a forwarding information base.

FIG. 5A illustrates a process used in one embodiment for automatically populating one or more access control lists based on a forwarding information base. Processing begins at process block 500, and proceeds to process block 502, wherein destination addresses (e.g., prefixes and fully-specified addresses) are extracted from the forwarding information base. In process block 504, ACL entries are identified based on these destination addresses and programmed in a lookup mechanism so as to match source addresses of packets (e.g., for performing reverse path forwarding) and associated with permit condition indications. In process block 506, an entry that will match any source address is typically programmed in the ACL after the entries identified in the previous operation and associated with a deny condition. At this point, the ACL is programmed and ready for searching. As indicated by process blocks 508 and 510, when an update to the FIB is identified, then the access control list entries are updated accordingly so as to maintain the integrity of the reverse path forwarding operations.

Figure 5B:
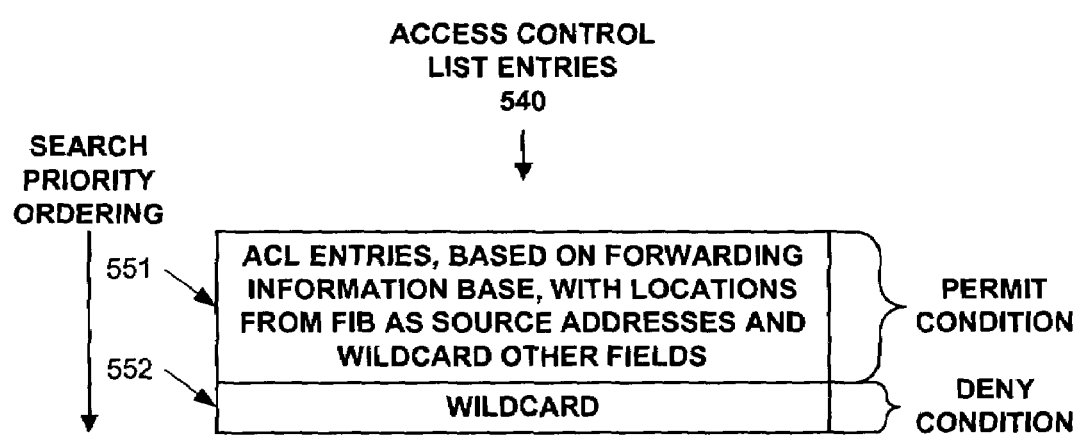
FIG. 5B is a block diagram illustrating access control entries generated and used in one embodiment.

FIG. 5B is a block diagram illustrating access control entries 540 generated and used in one embodiment. As shown, ACL entries 551 based on the destination addresses (e.g., prefixes and fully-specified addresses) and associated with permit conditions are programmed before in the search order an entry 552 that matches any source address and is associated with a deny condition.

Figure 6A:
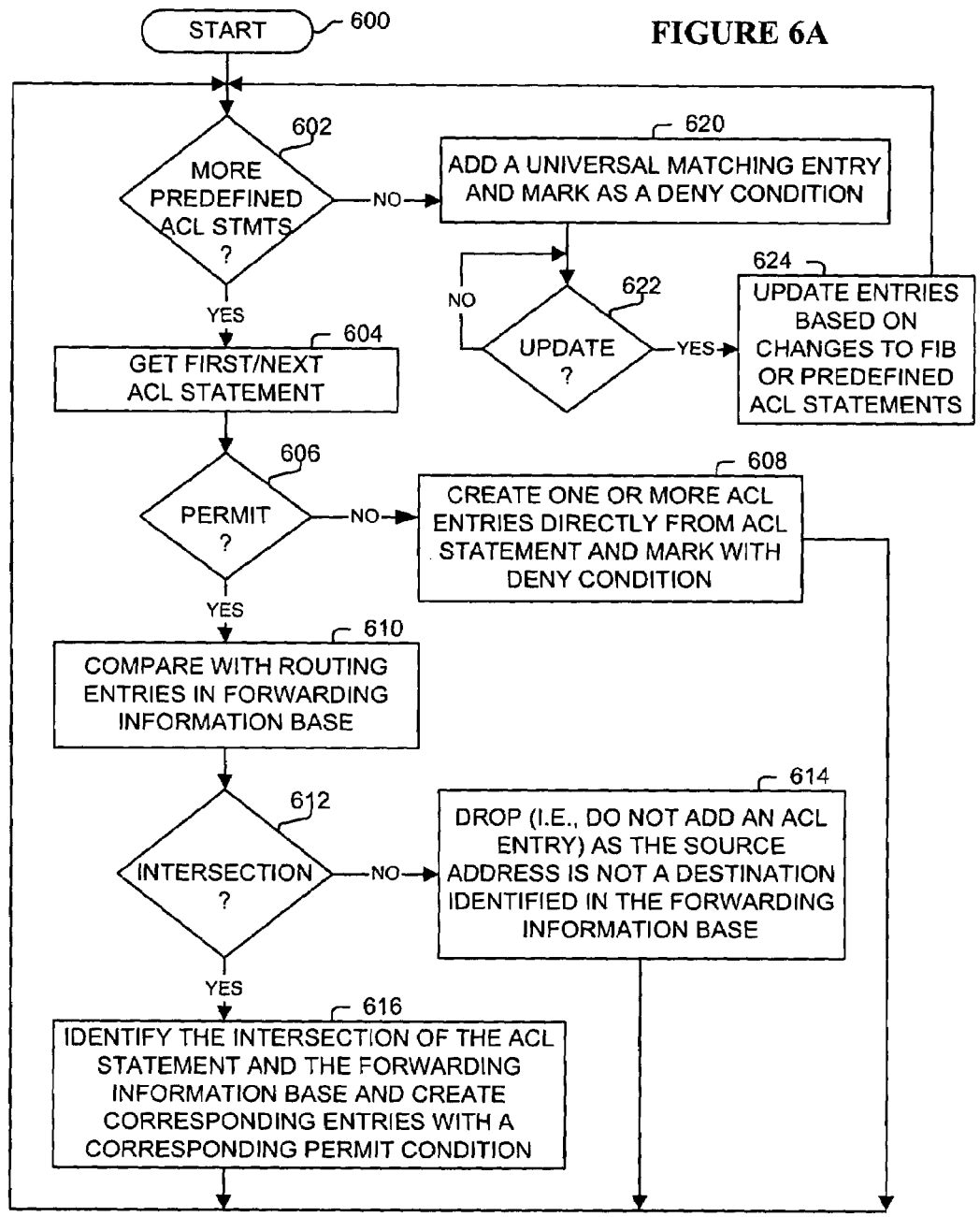
FIG. 6A illustrates a process used in one embodiment for automatically populating one or more access control lists based on a forwarding information base and a predefined access control list.

FIG. 6A illustrates a process used in one embodiment for automatically populating one or more access control lists based on a forwarding information base and a predefined access control list. Processing begins with process block 600. As determined in process block 602, while there are more predefine ACL statements, a first/next statement is identified in process block 604. As determined in process block 606, if the statement is not associated with a permit condition, then in process block 608, one or more ACL entries are generated directly from the statement and they are associated with a deny condition. Otherwise, in process block 610, the source address of the statement is compared with the destination addresses (e.g., prefixes and fully-specified addresses) in forwarding information base. As determined in process block 612, if there is an intersection, then one or more ACL entries are generated to cover this intersection with these entries being associated with a permit condition. Otherwise, in process block 614, the statement is ignored as the source address of the packet is not allowed (e.g., it is not identified as a destination address in the forwarding information base). Processing returns to process block 602. Note, typically, the ordering of the generated ACL statements is maintained, although certain optimization techniques can be applied to map these entries into other entries for use in an embodiment of the invention.

After all the predefined ACL statements have been processed, in process block 620, an entry that will match any source address is typically programmed in the ACL after the entries identified in the previous operation and associated with a deny condition. As indicated by process blocks 622 and 624, when an update to the FIB or predefined ACL is identified, then the access control list entries are updated accordingly so as to maintain the integrity of the reverse path forwarding and access control list operations.

Figure 6B:
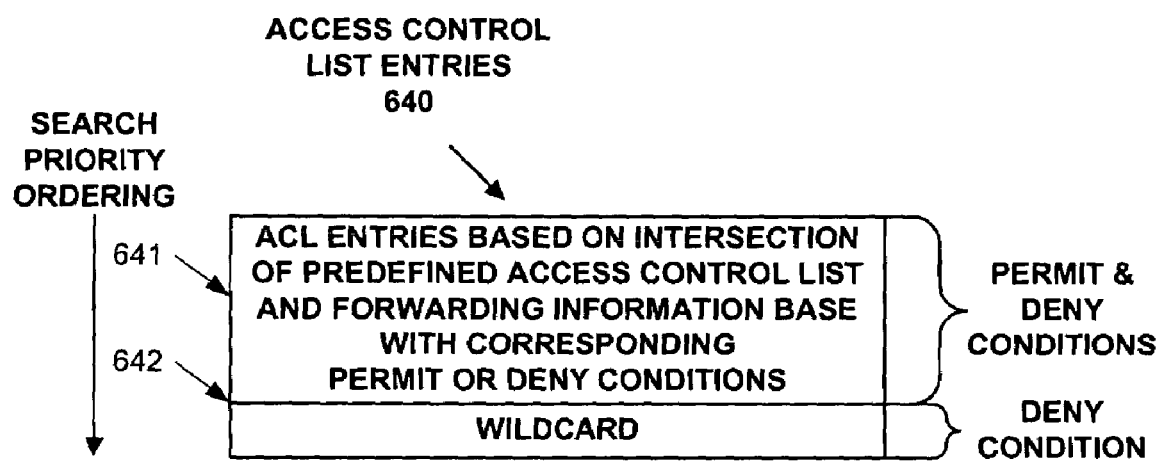
FIG. 6B is a block diagram illustrating access control entries generated and used in one embodiment.

FIG. 6B is a block diagram illustrating access control entries 640 generated and used in one embodiment. As shown, ACL entries 641 based on the intersection of the predefined ACL statements associated with a permit condition and the destination addresses (e.g., prefixes and fully-specified addresses) in the forwarding information base are programmed before in the search order an entry 642 that matches any source address and is associated with a deny condition.

Figure 7A:
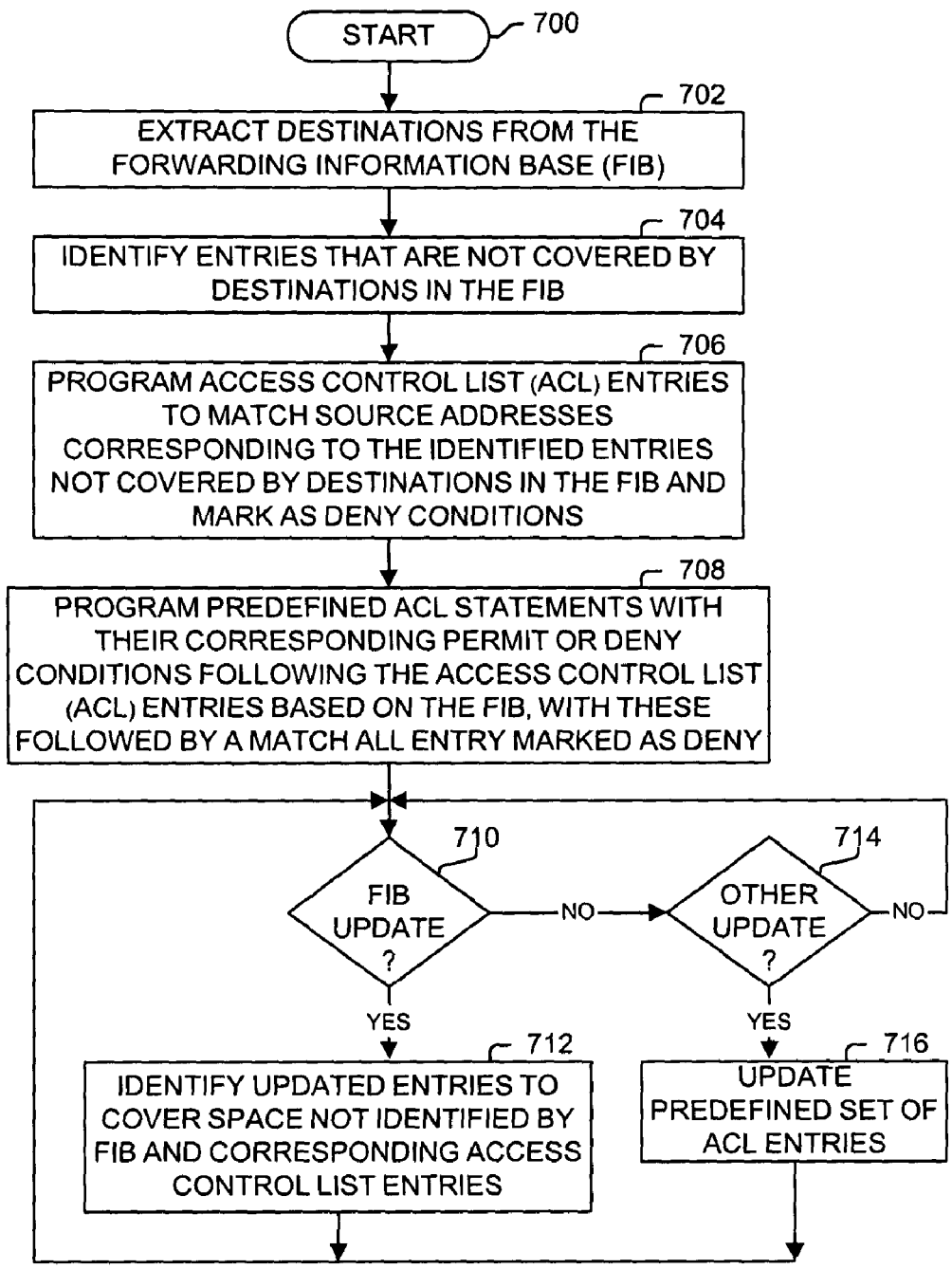
FIG. 7A illustrates a process used in one embodiment for automatically populating one or more access control lists based on a forwarding information base and a predefined access control list.

FIG. 7A illustrates a process used in one embodiment for automatically populating one or more access control lists based on a forwarding information base and a predefined access control list. Processing begins with process block 700, and proceeds to process block 702, wherein destination addresses (e.g., prefixes and fully-specified addresses) from the forwarding information base are identified. In process block 704, the complement of these addresses (in the context of all possible addresses) is identified. Reverse path forwarding allows packets having a source address and matching a destination address in the corresponding forwarding information base to forwarded/processed. Thus, packets not matching an address in the FIB are filtered/dropped. By identifying the set of all address not in the FIB, these can be programmed in an ACL (typically first in the search order) and associated with deny conditions, and followed by entries corresponding to predefined ACLs. Thus, these sections of the ACL/ACL entry sets can be updated independently.

Next, in process block 706, ACL entries with source addresses not matching destination addresses in the FIB (with other fields of the ACL entries typically wildcarded) are programmed and associated with deny conditions. In process block 708, entries corresponding to the predefined ACL statements are programmed, and typically followed by a wildcard entry associated with a deny condition. As illustrated in process blocks 710-716, in response to an update of the FIB or the predefined ACL statements, the corresponding ACL entries are updated.

Figure 7B:
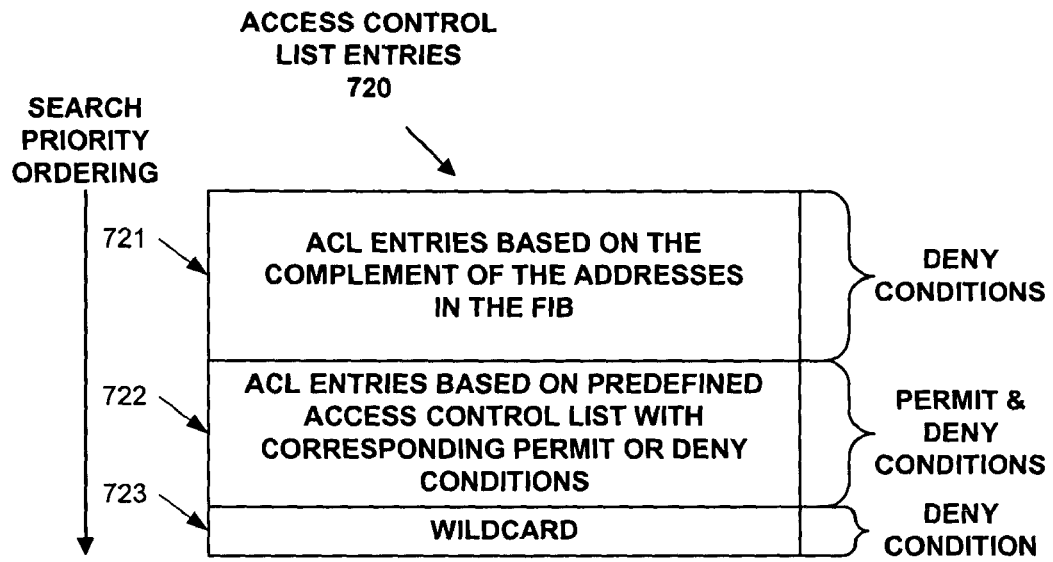
FIG. 7B is a block diagram illustrating access control entries generated and used in one embodiment.

FIG. 7B is a block diagram illustrating access control entries 720 generated and used in one embodiment. As shown, ACL entries 721 based on the set of addresses not found in the FIB (i.e., the complement of the address in the FIB) are programmed, followed by ACL entries 722 corresponding to the predefined ACL statements, and typically followed an entry 723 that matches any source address and is associated with a deny condition. (Of course, it is not necessary to add an entry 723 if one is found in entries 722 or the embodiment is configured not to add such entry 723). The term "set of address" typically refers to both fully-specified addresses and prefixes (which typically represent a contiguous set of fully-specified addresses).

Figure 7C:
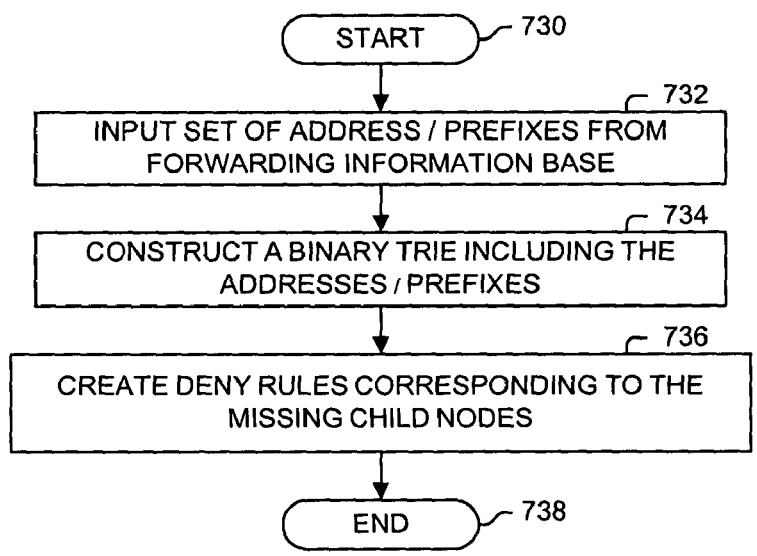
FIG. 7C illustrates a process used in one embodiment for automatically generating access control list deny entries based on a forwarding information base.

FIG. 7C illustrates a process used in one embodiment for automatically generating access control list deny entries based on a forwarding information base. Processing begins with process block 730, and proceeds to process block 732, wherein an input set of prefixes (possibly including fully-specified addresses) is identified. Next, in process block 734, a binary trie with permit nodes corresponding to the prefixes from the FIB is constructed. In process block 736, the deny rules are generated corresponding to the missing child nodes so as to identify the addresses not present in the FIB. Processing is complete as indicated by 738. (Note, this process can be repeated upon updates to the FIB or an optimized process performed to modify the trie and nodes to update the ACL entries.)

FIG. 7D illustrates a process 750 used in one embodiment for automatically generating access control list deny entry based on a forwarding information base. Shown is a recursive procedure GENERATE_DENY which receives an identification of a node of the trie as its input. This procedure traverses a binary trie with permit nodes created based on a forwarding information base (or other source), and generates the complement of the addresses/the desired deny ACL entries. If the current node is a leaf node and is not a permit node, then a deny entry is generated corresponding to the prefix of the node. If both child nodes are permit conditions, processing is complete. Otherwise, if the node has only one child, a deny entry is generated corresponding to the non-existent child node. Otherwise, this procedure is recursively called for each child node that is not a permit condition.

Figure 8A:
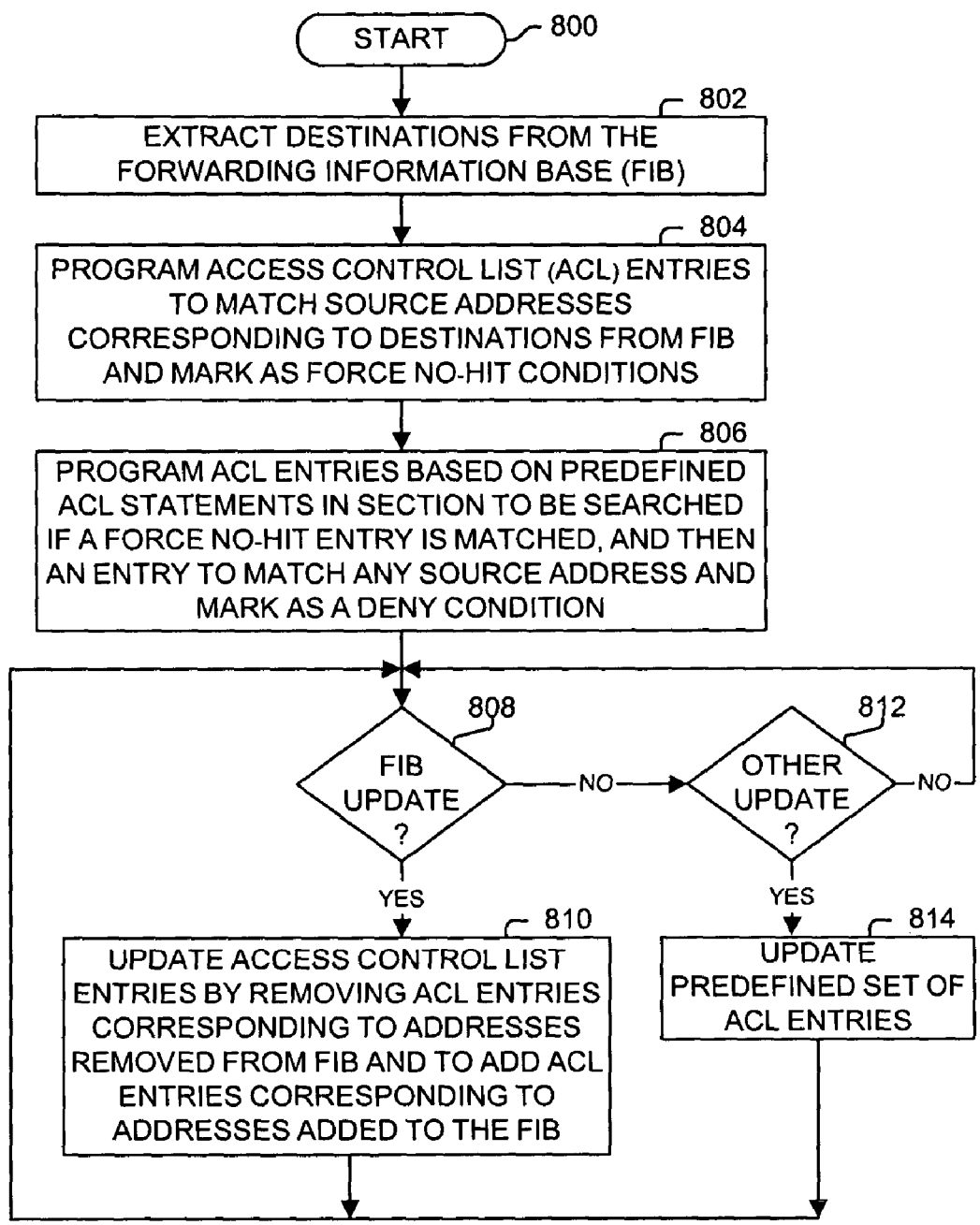
FIG. 8A illustrates a process used in one embodiment for automatically populating one or more access control lists based on a forwarding information base and a predefined access control list using force no-hit entries.

FIG. 8A illustrates a process used in one embodiment for automatically populating one or more access control lists based on a forwarding information base and a predefined access control list using force no-hit entries. Processing begins at process block 800, and proceeds to process block 802, wherein destination addresses (e.g., prefixes and fully-specified addresses) are extracted from the forwarding information base. In process block 804, ACL entries are identified based on these destination addresses are programmed in a lookup mechanism so as to match source addresses of packets (e.g., for performing reverse path forwarding) and are associated with permit force no-hit indications. Also, an entry that will match any source address is programmed in the ACL and is associated with a deny condition. Next, process block 806, ACL entries based on predefined acl statements are programmed so they are searched if a force no-hit entry is matched, which are typically followed by an entry to match any source address which is marked as a deny condition. As illustrated in process blocks 808-814, in response to an update of the FIB or the predefined ACL statements, the corresponding ACL entries are updated.

Figure 8B:
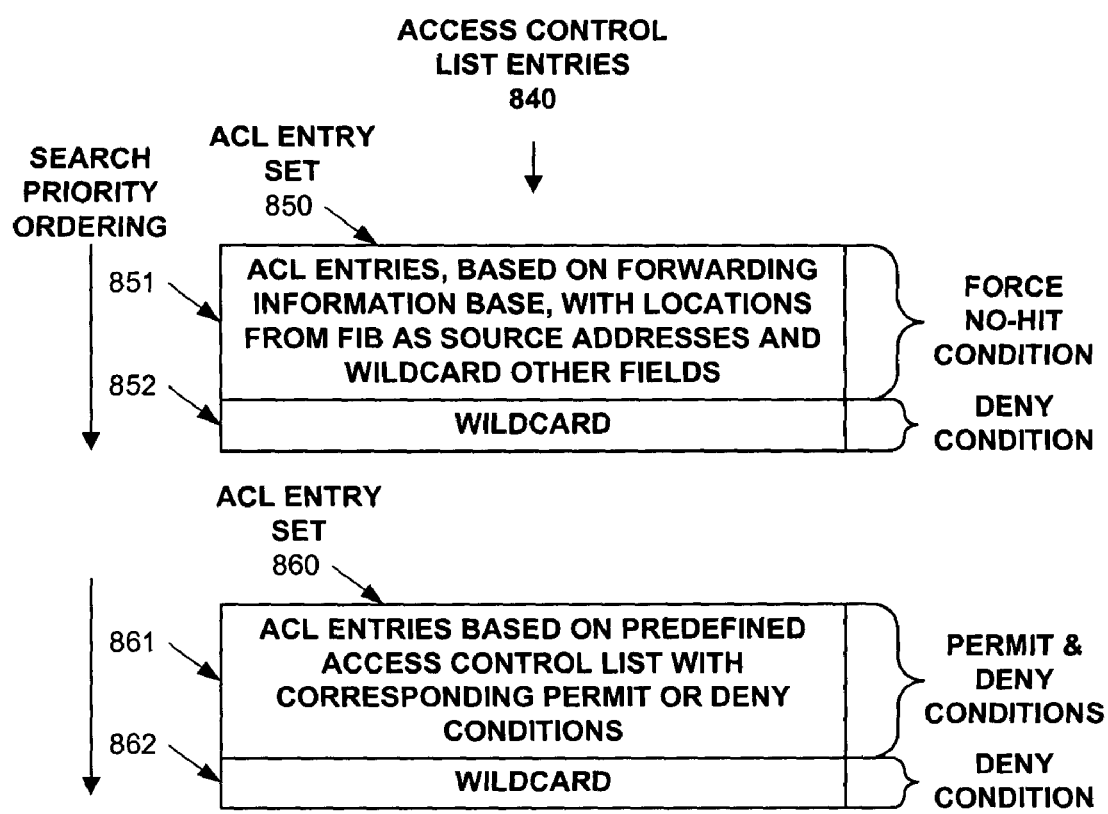
FIG. 8B is a block diagram illustrating access control entries generated and used in one embodiment.

FIG. 8B is a block diagram illustrating access control entries 840 generated and used in one embodiment. As shown, ACL entry set 850, includes ACL entries 851 based on the destination addresses (e.g., prefixes and fully-specified addresses) from the FIB and associated with force no-hit conditions followed by (in the search order) an entry 852 that matches any source address and is associated with a deny condition. ACL entry set 860 includes ACL entries 861 based on the predefined access control list followed by (in the search order) an entry 862 that matches any source address and is associated with a deny condition. A search is performed on ACL entry set 850 to identify a deny condition or a force no-hit condition. If a force no-hit condition is identified, then the result of the search of ACL entry set 860 is used as the result of the lookup operation. The searching of ACL entry sets 850 and 860 can be done in parallel or sequentially. Also, one mechanism of an unlimited number of mechanisms for performing lookup operations using force no-hit conditions is described in U.S. patent application Ser. No. 10/215,719, filed Aug. 10, 2002, which is hereby incorporated by reference.

Figure 8C:
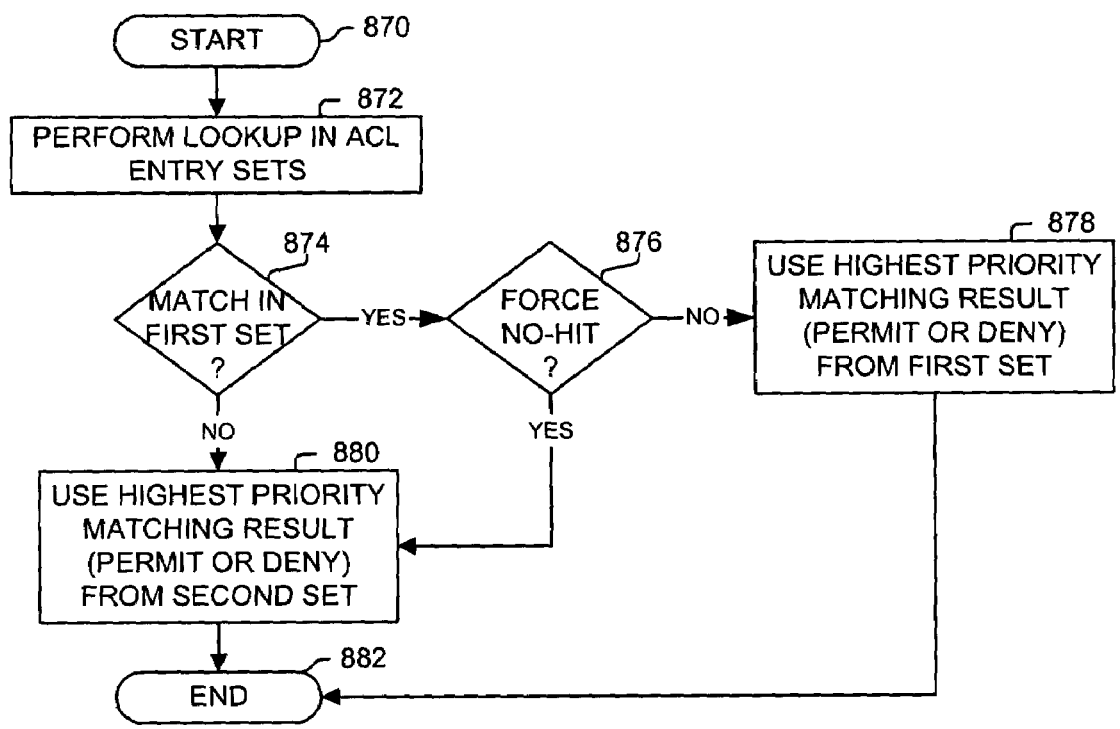
FIG. 8C illustrates one embodiment of performing a lookup operation in an ACL with force no-hit entries.

FIG. 8C illustrates one embodiment of performing a lookup operation in an ACL with force no-hit entries. Processing begins with process block 870, and proceeds to process block 872, wherein lookup operations are performed on the ACL entry sets. As determined in process block 874, if a match is identified in the first ACL entry set, and it does not correspond to a force no-hit condition as determined in process block 876, then in process block 878, the matching result first in the searching order is used (in one embodiment, this would always correspond to a deny condition—e.g., entry 852). Otherwise, as indicated by process block 880, the highest priority matching result from the second ACL entry set is used. In one embodiment, this process is repeated for an more than two entry sets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for processing packets, the method comprising:
   identifying a lookup value by extracting one or more values from a packet, said one or more values including a source address of the packet;
   performing an access control list lookup operation in an access control list based on the lookup value to identify a permit or a deny condition, wherein the access control list includes access control list entries;
   processing the packet based on the permit or the deny condition identified in said performing the access control list lookup operation, wherein said processing the packet based on the permit condition includes performing a forwarding lookup operation on a representation of a forwarding information base to identify a location and forwarding the packet to the location; and
   automatically generating the access control list entries based on the forwarding information base;
   wherein said automatically generating the access control list entries includes automatically generating the access control list entries based on the forwarding information base and a predefined access control list.

2. The method of claim 1, wherein said automatically generating the access control list entries includes identifying, for an entry associated with a permit condition of the predefined access control list, an intersection of the source address of the entry and addresses in the forwarding information base, and generating one or more of the access control list entries based on the intersection.

3. The method of claim 1, wherein said automatically generating the access control list entries includes identifying a plurality of deny operation entries based on the forwarding information base, the plurality of deny operations corresponding to a complement of addresses in the forwarding information base, and placing the plurality of deny operation entries before, in a search order, a plurality of predefined access control list entries corresponding to the predefined access control list; and wherein the deny condition is generated if one of the plurality of deny operation entries is matched during said performing the access control list lookup operation.

4. The method of claim 3, wherein said identifying the plurality of deny operation entries based on the forwarding information base includes constructing a binary trie based on the forwarding information base, and traversing the binary trie to identify the plurality of deny operation entries.

5. The method of claim 1, wherein said performing the access control list lookup operation includes performing an associative memory lookup operation on an associative memory, wherein the access control list is programmed into the associative memory; and wherein said entries automatically generated based on the forwarding information base are configured to generate a force no-hit result if matched during said performing the associative memory lookup operation to result so that the permit or deny condition is identified based on associative memory entries corresponding to the predefined access control list, and the associative memory includes one or more deny entries to generate the deny condition if none of said entries automatically generated based on the forwarding information base are matched.

6. The method of claim 1, wherein the access control list entries are automatically updated in response to a change to the forwarding information base.

7. An apparatus for processing packets, the apparatus comprising:
  means for identifying a lookup value by extracting one or more values from a packet, said one or more values including a source address of the packet;
  means for performing an access control list lookup operation in an access control list based on the lookup value to identify a permit or a deny condition, wherein the access control list includes access control list entries;
  means for processing the packet based on the permit or the deny condition identified in said performing the access control list lookup operation, wherein said processing the packet based on the permit condition includes performing a forwarding lookup operation on a representation of a forwarding information base to identify a location and forwarding the packet to the location; and
  means for automatically generating the access control list entries based on the forwarding information base;
  wherein said means for automatically generating the access control list entries includes means for automatically generating the access control list entries based on the forwarding information base and a predefined access control list.

8. The apparatus of claim 7, wherein said means for automatically generating the access control list entries includes means for generating one or more of the access control list entries based on the intersection of an entry associated with a permit condition of the predefined access control list and addresses in the forwarding information base.

9. The apparatus of claim 7, wherein said automatically generating the access control list entries includes means for identifying a plurality of deny operation entries based on the forwarding information base, the plurality of deny operations corresponding to a complement of addresses in the forwarding information base; wherein the plurality of deny operation entries are placed before, in a search order, a plurality of predefined access control list entries corresponding to the predefined access control list; and wherein the deny condition is generated if one of the plurality of deny operation entries is matched during the access control list lookup operation.

10. The apparatus of claim 9, wherein said means for identifying the plurality of deny operation entries based on the forwarding information base includes means for constructing a binary trie based on the forwarding information base and for traversing the binary trie to identify the plurality of deny operation entries.

11. The apparatus of claim 7, wherein said means for performing the access control list lookup operation includes means for performing an associative memory lookup operation on an associative memory, wherein the access control list is programmed into the associative memory; and wherein said entries automatically generated based on the forwarding information base are configured to generate a force no-hit result if matched during said performing the associative memory lookup operation to result so that the permit or deny condition is identified based on associative memory entries corresponding to the predefined access control list, and the associative memory includes one or more deny entries to generate the deny condition if none of said entries automatically generated based on the forwarding information base are matched.

12. The apparatus of claim 7, including means for automatically updating the access control list entries in response to a change to the forwarding information base.

13. An apparatus comprising:
  a lookup value generator configured to generate a lookup value by extracting one or more values from a packet, said one or more values including a source address of the packet;
  an access control list lookup mechanism configured to perform an access control list lookup operation in an access control list based on the lookup word to identify a permit or a deny condition;
  a packet processor configure to process the packet based on the permit or the deny condition identified by the access control list lookup operation, wherein said processing the packet based on the permit condition includes performing a forwarding lookup operation on a representation of a forwarding information base to identify a location and forwarding the packet to the location; and
  an access control list generator configured to automatically generate entries in the access control list based on the forwarding information base;
  wherein the access control list generator automatically generates entries based on the forwarding information base and on a predefined access control list.

14. The apparatus of claim 13, wherein the access control list generator identifies, for an entry associated with a permit condition of the predefined access control list, an intersection of the source address of the entry and addresses in the forwarding information base, and generating one or more of the access control list entries based on the intersection.

15. The apparatus of claim 13, wherein the access control list generator identifies a plurality of deny operation entries based on the forwarding information base and places the plurality of deny operation entries before, in a search order, a plurality of predefined access control list entries corresponding to the predefined access control list in generating the access control list entries; and wherein the access control list lookup mechanism generates the deny condition if one of the plurality of deny operation entries is matched during the access control list lookup operation.

16. The apparatus of claim 15, wherein the access control list generator identifies the plurality of deny operation entries based on the forwarding information base by performing operations including constructing and traversing a binary trie based on the forwarding information base.

17. The apparatus of claim 13, wherein the access control list lookup mechanism includes an associative memory; wherein the access control list is programmed into the associative memory; and wherein said entries automatically generated based on the forwarding information base are programmed into the associative memory in a manner to generate a force no-hit result if matched during the associative memory lookup operation so that the permit or deny condition is identified based on associative memory entries corresponding to the predefined access control list, and the associative memory includes one or more deny entries to generate the deny condition if none of said entries automatically generated based on the forwarding information base are matched.

18. The apparatus of claim 13, wherein the access control list generator updates the access control list entries in response to a change to the forwarding information base.

19. Logic encoded in one or more tangible media for execution and when execute operable to perform the operations of:
  identifying a lookup value by extracting one or more values from a packet, said one or more values including a source address of the packet;
  performing an access control list lookup operation in an access control list based on the lookup value to identify a permit or a deny condition, wherein the access control list includes access control list entries;
  processing the packet based on the permit or the deny condition identified in said performing the access control list lookup operation, wherein said processing the packet based on the permit condition includes performing a forwarding lookup operation on a representation of a forwarding information base to identify a location and forwarding the packet to the location; and
  automatically generating the access control list entries based on the forwarding information base;
  wherein said automatically generating the access control list entries includes automatically generating the access control list entries based on the forwarding information base and a predefined access control list.

20. The logic of claim 19, wherein said automatically generating the access control list entries includes identifying, for an entry associated with a permit condition of the predefined access control list, an intersection of the source address of the entry and addresses in the forwarding information base, and generating one or more of the access control list entries based on the intersection.

21. The logic of claim 19, wherein said automatically generating the access control list entries includes identifying a plurality of deny operation entries based on the forwarding information base, the plurality of deny operations corresponding to a complement of addresses in the forwarding information base, and placing the plurality of deny operation entries before, in a search order, a plurality of predefined access control list entries corresponding to the predefined access control list; and wherein the deny condition is generated if one of the plurality of deny operation entries is matched during said performing the access control list lookup operation.

22. The logic of claim 21, wherein said identifying the plurality of deny operation entries based on the forwarding information base includes constructing a binary trie based on the forwarding information base, and traversing the binary trie to identify the plurality of deny operation entries.

23. The logic of claim 19, wherein said performing the access control list lookup operation includes performing an associative memory lookup operation on an associative memory, wherein the access control list is programmed into the associative memory; and wherein said entries automatically generated based on the forwarding information base are configured to generate a force no-hit result if matched during said performing the associative memory lookup operation to result so that the permit or deny condition is identified based on associative memory entries corresponding to the predefined access control list, and the associative memory includes one or more deny entries to generate the deny condition if none of said entries automatically generated based on the forwarding information base are matched.

24. The logic of claim 19, wherein the access control list entries are automatically updated in response to a change to the forwarding information base.

* * * * *